(12) United States Patent
Chang

(10) Patent No.: US 10,323,584 B2
(45) Date of Patent: Jun. 18, 2019

(54) METHOD OF CONTROLLING AN ENGINE OF A VEHICLE

(71) Applicant: Fu Ling Chang, Taoyuan County (TW)

(72) Inventor: Fu Ling Chang, Taoyuan County (TW)

(73) Assignee: Fu Ling Chang, Taoyuan County (TW)

( * ) Notice: Subject to any disclaimer, the term of this patent is extended or adjusted under 35 U.S.C. 154(b) by 96 days.

(21) Appl. No.: 15/201,504

(22) Filed: Jul. 3, 2016

(65) Prior Publication Data

US 2016/0312715 A1 Oct. 27, 2016

Related U.S. Application Data

(63) Continuation of application No. 13/919,001, filed on Sep. 14, 2013, now Pat. No. 9,410,491.

(30) Foreign Application Priority Data

Jun. 19, 2012 (TW) .............................. 101121833 A

(51) Int. Cl.
| | | |
|---|---|---|
| *F02D 29/02* | (2006.01) | |
| *B60Q 1/06* | (2006.01) | |
| *F02D 11/10* | (2006.01) | |
| *F02D 11/00* | (2006.01) | |
| *F02D 11/02* | (2006.01) | |

(Continued)

(52) U.S. Cl.
CPC ............... *F02D 29/02* (2013.01); *B60Q 1/06* (2013.01); *B60Q 1/143* (2013.01); *B60Q 1/26* (2013.01); *B60Q 1/28* (2013.01); *F02D 11/00* (2013.01); *F02D 11/02* (2013.01); *F02D 11/10* (2013.01); *F02D 11/105* (2013.01);

(Continued)

(58) Field of Classification Search
None
See application file for complete search history.

(56) References Cited

U.S. PATENT DOCUMENTS

| 6,699,155 B2 * | 3/2004 | Nagasaka ........... F16H 59/0204 |
| | | 701/62 |
| 2008/0201064 A1 * | 8/2008 | DiGonis ............... B60W 10/06 |
| | | 701/110 |

(Continued)

FOREIGN PATENT DOCUMENTS

| DE | 102008021688 A1 * | 11/2009 | ............. B60Q 1/143 |
| JP | S6375323 | * 4/1988 | |

(Continued)

OTHER PUBLICATIONS

Shimozaka; Machine Translation of JPS6375323; Apr. 1988; espacenet.com (Year: 1988).*

(Continued)

*Primary Examiner* — David P. Merlino
(74) *Attorney, Agent, or Firm* — Min-Lee Teng; Litron Patent & Trademark Office

(57) ABSTRACT

A simple and effective control method is disclosed for starting and stopping a vehicle's engine and automatic lighting of position lamps to show the vehicle's location. The method uses brake and gear shift lever of the vehicle to generate selection signals, and a button switch can be pressed to stop or start the engine of the vehicle according to the selection signals, which can provide vehicle drivers a simple and secure way to control their vehicles while waiting at a stoplight.

5 Claims, 2 Drawing Sheets

(51) Int. Cl.
*B60Q 1/14* (2006.01)
*B60Q 1/28* (2006.01)
*B60Q 1/26* (2006.01)

(52) U.S. Cl.
CPC ...... *F02D 11/106* (2013.01); *B60Q 2300/116* (2013.01); *B60Q 2300/314* (2013.01); *F02D 2011/101* (2013.01)

(56) References Cited

U.S. PATENT DOCUMENTS

| | | | |
|---|---|---|---|
| 2010/0244557 A1* | 9/2010 | Ito | F02N 11/0803 307/9.1 |
| 2011/0277578 A1* | 11/2011 | McGuire | F16H 59/0278 74/473.3 |
| 2012/0316030 A1* | 12/2012 | Choi | B60R 25/24 477/99 |
| 2013/0158838 A1* | 6/2013 | Yorke | B60W 10/06 701/103 |

FOREIGN PATENT DOCUMENTS

| | | | |
|---|---|---|---|
| JP | 2002178781 A | * | 6/2002 |
| JP | 2007253918 A | * | 10/2007 |

OTHER PUBLICATIONS

WikiHow; How to Drive Manual; Jun. 14, 2008, htttps://web.archive.org/web/20080614034052/https://www.wikihow.com/Drive-Manual (Year: 2008).*

* cited by examiner

METHOD OF CONTROLLING AN ENGINE OF A VEHICLE

CROSS-REFERENCE TO RELATED APPLICATION

This application is a continuation of U.S. patent application Ser. No. 13/919,001 filed on Jun. 17, 2013, which claims the priority benefit of Taiwan application serial no. 101121833, filed on Jun. 19, 2012. Each of the above-mentioned patent applications is hereby incorporated by reference herein.

BACKGROUND OF THE INVENTION

Field of the Invention

It is related to a control method for controlling vehicles engine with simple, effective and security operation mode to start or to stop vehicle engine; in particular, a kind of control method and control device operating on motorcycle for starting and stopping engine. In addition, it is related to a position lamp controller or a light sensing mode to detect vehicle ambient luminance for automatically and timely lighting the position lamps in order to show vehicles location, so as to ensure the safety of the vehicle at places with low ambient luminance.

Description of the Prior Art

The engine idling behavior of engine vehicle will consume energy, pollute air, and adds greenhouse-gases emissions, which is causing engine cumulative carbon aging—the main reason of engine power loss. If you can reduce engine idling time and behavior, it will be an effective environmental protection action. Many city or national provision policy require that the vehicle engine must be shut off if the vehicle is idling for a few minutes, so as to solve the environmental protection problem, which should be implemented for vehicles to stop engine while waiting at a stop light.

The governments policy that vehicles engine must be shut off if the vehicle is idling for a few minutes is mainly regulated on a non-traffic area such as parking on roadsides, parking area . . . etc. in which there is no safety concern. However, it is difficult to implement the policy for vehicles temporary parking at places such as in front of a stoplight, railroad crossings . . . etc. The main purpose of the present invention is for those questions.

The conventional way to control vehicles idling generally uses sensors on the vehicle to sense the speed of a vehicle, engine speed, engine temperature, battery state of the electricity, the throttle opening . . . etc. to automatically stop or start the engine of vehicle with certain preset conditions, which is the mainstream of the industry and can be read from the specification of the vehicle.

Traditionally, the key switch of a vehicle can start or stop the engine of the vehicle; but, if you want to operate the key witch to start or stop the engine while waiting at a stop light on the traffic road, it will be cumbersome; and the key switch will be easily damaged if it is operated so often.

Some of vehicles add an electric button switch to start or stop the engine of the vehicle; however, the simple press type button switch does not provide security mechanisms in order to prevent unwanted touch or press which will cause unpredictable danger. There are many other different machinery structure design, hoping to provide a way for vehicle driver to start or stop the engine manually.

When a engine idles for a minute, then it will "auto-stop"; and when pressed on the accelerator then it will "auto-starts", that is the technical development trend of vehicle in the latest mainstream to provide safeguard management and a security design within a certain range of reliability. But, it is complicated, costly, and unable to fully meet various traffic status and unable to fully adapt various traffic conditions, which requires another button to release such mechanism under certain traffic conditions.

There are research and development focused on technologies to control the start or stop of the engine of a vehicles. In addition, the potential factors of traffic safety is another technical issue that is worth our attention. Furthermore, how to show the location of a vehicle in a dim environment is also a focal point for research.

Some European and American countries require that traveling vehicles must turn on the headlights, which is a enforcement with an intention to show locations of vehicles in a tunnel, dark or the foggy climatic environments to allow other vehicle drivers to notice them so as to avoid traffic accidents.

The negligence of forgetting to turn on headlights may also happen at night. Drivers driving on the road at night all have a common horror experience when suddenly encountered other traveling vehicle moving toward them without turning on the headlights, which will cause the drivers nervous.

The vehicle driver tends to forget to turn on the lights when daylight is disappearing. In addition, under some environment illumination, the humanity sense is getting fatigued and the reaction and spirit are also getting slow, which will cause divers to forget to turn on the vehicle lamps easily, no matter they are driving a car, motorcycle; drivers of rickshaws, bicycles . . . etc., are facing more dangers at night.

Currently, most automobile or motorcycle manufacturers configure Daytime running lights as the primary technical means to tackle the aforementioned problems. Although Daytime running lights usually use energy-efficient LED bulbs, however, under sunlight, lighting the LED lights also generates the carbon footprint and also consume power of a battery with limited power, which is causing unnecessary waste. for vehicles without using a battery, such as a bicycle, usually uses a flash lamp to show its location.

Some vehicles have a circuit design that closes the power supply of headlights when engine is stopped to avoid excessive discharge of the battery affecting engine restart; this type of vehicle driving on the road operate no-idling at dark environments, will not effectively display the vehicle location, and still have the traffic safety problem.

There are numerous problems, such as vehicle drivers forgetting to turn on headlights on the road in a lowed illuminated environment, the lack of lighting when the engine is turned off when idling or stopping, wasting electricity when driver turn on the headlights in the daytime; storage battery still consume power when engine stop with lighting headlights. If further technology is able to solve these problems, it can also be applied to automobiles, contributing greatly to traffic safety, energy conservation and environmental protection.

It is easier to apply this technology to newly produced cars through the design of new cars. If one wants to apply this technology to existing vehicles and not affect the original functions of the vehicles, further development is needed.

As a result, a method and device for vehicle stop and starting and position-lamps display that is cheap, easy to install, safe, and can be applied to existing vehicles is novel, inventive and a contribution to the society.

SUMMARY OF THE INVENTION

The present invention relates to a control method for a vehicle's engine starting and stopping, and auto-lighting position lamps to show a vehicle's location. Implementing the present method to control devices can effectively process and resolve the aforementioned faced problems. The present invention for vehicle's engine start and stop control method features are as follows: Automobiles can be mainly divided into two types, Automatic Transmission (AT) and Manual Transmission (MT. Unlike other manual gear shift motorbike (MT), the motorcycles/Scooter without manual clutch belong with the (AT) kind; Based on different characteristics of the vehicle, choose two or more appropriate vehicle controlling equipment, such as brakes, clutch, the gear shift each location . . . etc. that provide electric signal sources. Divide these signal sources into two obviously different groups of electric signals, then connect them electrically to the integration controller, serving the purpose of starting and stopping the engine; when the vehicle driver operates these controlling equipment, and the preset generating selection signal state is reached, it will produce two corresponding selection signals; one for starting the engine and the other for stopping the engine.

A confirmation signal, which can come from an electric switch, used to confirm the selection signals purpose; the electric button switch is electrically connected to the integration controller; when the vehicles driver is in the driving vehicles process, and a pre-defined of the controlling equipment status has been met, a selection signal will be produced; when the vehicle driver wants to perform engine starting or stopping of the operation, then in equipment status accord their purpose at the time, the integration controller already make the selection signal, if pressing button switch to send out confirmation signal, the integration controller received the confirmed signal at the time, will define the selection signal purpose, through the vehicle work piece with electrical connection to integration controller and enough to starts or to stop engine to drive those original vehicle equipment operation, and completed the selection signal purposes. Through planning the manipulation equipment status to generate selection signals, here, by operational the equipment status provided the purposes selection; then, by the confirmation signal to confirm the purpose, and, by the integration controller to drive the original vehicle equipment of operation conduct, completed the selection signal purposes, therefore, the confirmation signal is confirmed and implemented of the selection signal that the security mechanisms.

The present invention provides a simple, secure and effective method to start and stop the engine, allowing drivers to autonomously and quickly control the engine. This method is particularly suitable for drivers who want to stop their engine on the road, avoiding and idling while waiting. This is the best mode for operating starting and stopping engine.

In particular, application of motorcycles controlling equipment, it can choose between the motorcycles front and rear wheel brake lever electric switch as generate two selection signal of the source; this will make the parallel circuit connection disconnect in existing technology, forming the two separate manipulation equipment signal sources, to respectively became the two selection signal purpose sources group of starting or stopping engine. By the motorcycle two brakes lever and original started button mutual collocation, used to start or stop engine control, make motorcycle drivers to operation no-idling when waiting stoplight or railway level crossings, and ease of controlling engine stops, avoid idling energy waste and air pollution, and then, can quickly restart engine to continue the trip; to achieve energy conservation, reduce carbon emissions and reduce air pollution and environmental protection purposes.

And then, an effective solution according to traffic laws regarding vehicles in dim illuminance situations displaying location. An environment illuminance sensor, the illuminance induction element or illuminance detection device is set in a suitable location of the vehicle in order to provide the detection of vehicle location's ambient illuminance intensity, and produce the corresponding parameter signal; and a position lamp controller, comprising electronic elements and logic circuits, coupled to the environment illuminance sensor. The position lamp controller is also coupled to lamps used to indicate the position of the vehicle. The lamp mentioned in the present article refers to any luminescence element that will be lit by conduction electric current or a plurality of luminescence element the devices. If the luminescence devices also contain driving apparatus, it also included in this.

When the position lamp controller receive the environment illuminance sensor parameter value which satisfies the setting value, it will provide a power supply to the position lamps to light it; when the received parameter value does not meet the set value, it will make the position lamps emerge power supply turning off the state; so that the vehicles can auto-light vehicle position lamps features to show the vehicle location's. It will provide safety for vehicles in the tunnel, underpass, boulevard, or the weather rainy, fog, dawn, twilight, or night . . . etc. When in such a dim environment, it will automatically open the vehicle position lamps to highlight the vehicle of location, effectively attracting the attention of other persons on the roads, letting other vehicle driver to clearly see your vehicle to prevent others negligence causing safety hazards, and avoid carriageway risk, ensuring the safety when driving and waiting.

The present method and device of auto-lighting position lamps to show vehicle location can also be used on engine/electric vehicles, human vehicles, bicycles . . . and other various types of vehicles achieve the purpose of indicating position by lighting. Features of the present invention are summarized as follows:

Selection signal: based on different vehicles, focusing consistently on human factors engineering, driving habits and safety considerations, choose two or more original vehicle controlling equipment, such as brakes, clutch, the gear shift each location . . . etc., and choose two to make the best combination of electrical signal sources.

Confirmation signal: can be from the original start button or a newly added button switch to generate the confirmation signal; the vehicle driver operates the vehicles manipulation equipment that generate corresponding defined selection signal, when according to the vehicle driver purpose, the driver pressing button switch to send out confirmation signal, here, only when the selection signal and the confirmation signal combine will the integration controller issue action command, driving the vehicle to its original actual implementation mechanism and completing the action. Through the purpose of vehicle driver determine to start or stop engine action that is the present invention design concept of security mechanism control method. A confirmation signal, a safety mechanism, trigger two defined selection signals to finish the implementation of engine starting or engine stopping, and its control method is simple; control processes are safe, and control results is reliability and efficiency.

Use the vehicle key switch to open and to close the integration controller function, to make the vehicles master switch ON, and the integration controller begin to work. The integration controller is processing the section of control signals; the actions of the engine start or stop are actually driving by the original mechanism of vehicle, and will not have the apprehension of vehicle circuit security. Provide motorcycle driver an explicit, secure, simple and reliable engine control technology.

Conducive to vehicles engine operation no-idling, it is a kind of simple, security and effective control mode, when the vehicle original performance is sufficient, the driver can autonomously start or stop the vehicle engine instantly; the vehicle operation no-idling does not need countdown and the judgment program, there is no "automatic idling stop system" to cause the driver trouble. Vehicles no-idling saves energy and is more efficient, also reducing air pollution more certainly.

Resolve various kinds of engine vehicles operating no-idling, and the best position lighting control methods for vehicle parking on the roads when the poor ambient illumination. The traffic safety problems of vehicle driving on the road in dim of environmental without opening headlight, there is the best technically of practical approach to solve vehicle location display purpose. Provide vehicles with no power equipment to display position, the best mode to maintaining security. Can produce merchandise with method practical, effect reliable, modification simple, and inexpensive.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principle of the invention.

DESCRIPTION OF EMBODIMENTS

Hereinafter, this invention will be applied to motorcycles and scooter as an example to illustrate the creative connotations of the present invention; conventionally, there are two brake levers (left and right) on the motorcycle/scooter handle bars. The left side brake lever controls the rear wheel brake. The right brake lever controls the front wheel brake, and both produce brake signals.

Figure 1:
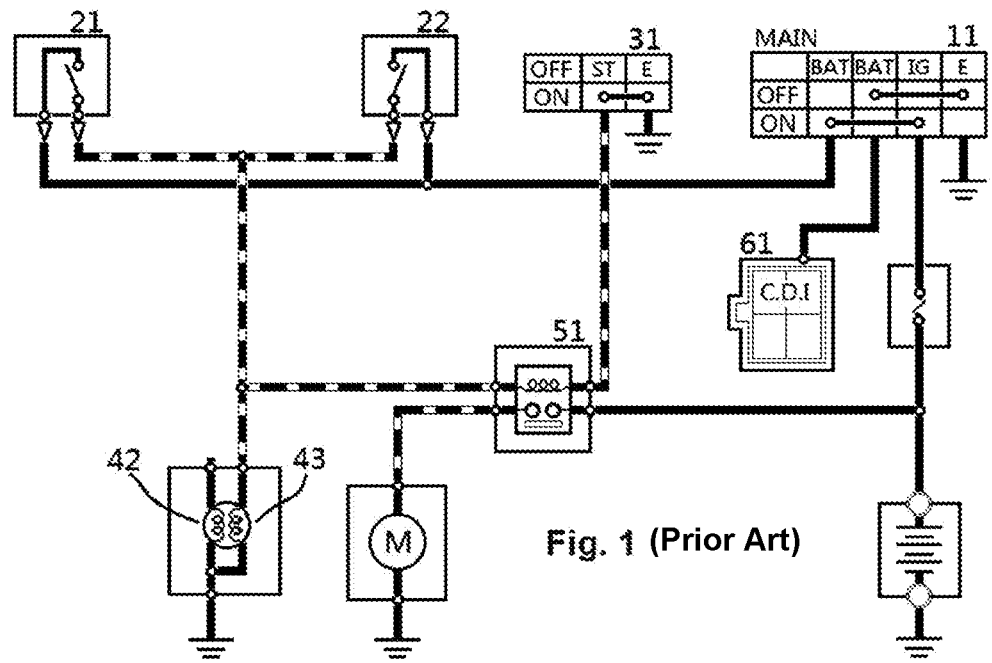
FIG. 1 is a schematic diagram of existing circuit technology in motorcycles.

FIG. 1 is a schematic diagram of existing circuit technology in motorcycles; the left (21) and right (22) brake levers switches are in parallel, and the brake lights (43) will be turned on when any one brake lever is pressed; when the start button switch (31) is pressed, the ground signal will be conducted, enabling the start relay (51) and starting the engine. When the vehicle's key switch (11) is turned off, the CDI electronic ignition system (61) obtains a grounded signal and turns off the power or oil supply, thus stopping the engine.

Figure 2:
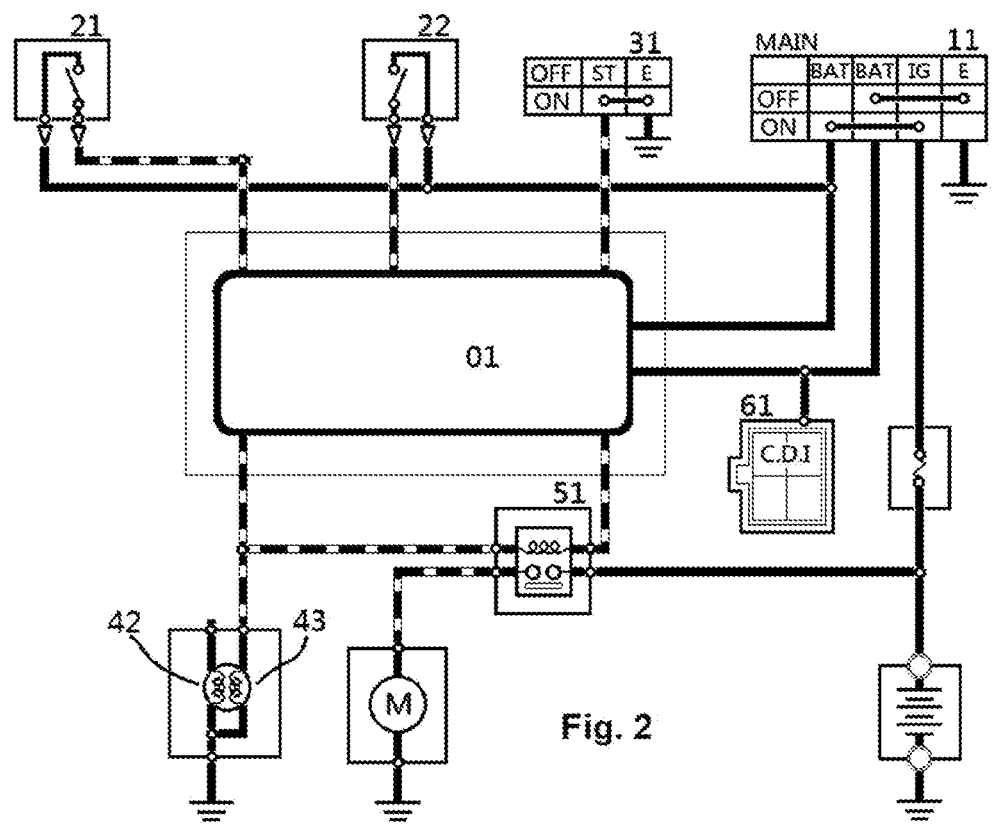
FIG. 2 is a diagram of the circuitry in the integrated controller

FIG. 2 is a diagram of the circuitry in the integrated controller. In existing circuitry in motorcycles, parallel circuit of the left (21) and right (22) brake lever electrical switch, to form for individual independent of controlling device signals source, and respectively electrical connection to the integration controller (01), to become the two selection signals source in the present invention; and the vehicle's brake lights (43) are also electrically connected to the integration controller (01), in order to maintain the original functionality of the motorcycle.

Define the two selection signals: the selection signal generated by the left brake lever switch (21), whose purpose is starting the engine; the selection signal generated by the right brake lever switch (22), whose purpose is turning off the engine. (Note: The two selection signal sources are defined so as to provide a unified specification operation mode, providing motorcycle drivers of any brand of motorcycle a fixed, simple, easy to use, and best standard mode of operation; and not intended to limit the scope of the present invention.)

The integration controller (01) is electrically connected to the wire of the key switch (11) ON of the vehicle, as a way to start the integration controller (01) function and provide a current source to the supply lights; the integration controller (01) is electrically connected to the start button switch (31) to receive the confirmation signal; the integration controller (01) is electrically connected to the start relay (51) of the vehicle to issue an instruction to start the engine; and the integration controller (01) is electrically connected to the wires of the key switch (11) OFF and the connection pins of the C.D.I electronic ignition system (61), to issue an instruction to stop the engine.

When the motorcycle's key switch (11) is turned on; the integration controller (01) circuit enters the standby state. When the left brake lever (21) is pressed, a selection signal for starting the engine will be generated and provide power to turn on the brake light (43); If the driver wishes to start the engine and presses the start button (31) at the same time, the integration controller (01) will issue an instruction to the start relay of the vehicle (51), turning on the engine.

When the driver wishes to stop the engine and presses the right brake lever (22), a selection signal for turning off the engine will be generated and provide power to turn on the brake light (43); if the start button (31) of the vehicle is pressed at the same time, the integration controller (01) will issue an instruction to the C.D.I of the vehicle (51), turning off the engine.

When simultaneously pressing the left brake lever (21) and the right brake lever (22), both produce selection signals. If the start button (31) is then pressed again, the integration controller (01) will only accept the selection signal to stop the engine generated from the right brake lever (22), and issue an instruction, through the C.D.I (61) to complete the operation of stopping the engine.

If restarting the engine is desired, pressing [the left brake lever (21)]+[the start button (31)] will start the engine again; if turning off the engine again is desired, pressing [the right brake lever (22)]+[the start button (31)] will stop the engine again; providing a very clear and simple control technology to start and stop the engine for drivers.

No matter how the brake levers are operated, it is necessary to press the start button (31) to conduct the electric switch and produce a confirmation signal so that the integration controller (01) may then stop or turn on the engine. This is a secure, reliable and simple way to control the starting and shutdown of the engine. If the start button (31) is not pressed during the standby state, then only existing functionality of the motorcycle, such as turning the wheels or turning on the brake lights, can be performed.

The abovementioned is to illustrate the concept of the present invention "Method to control the starting and shutdown of an engine in a vehicle"; such a method will allow vehicle drivers to start and shutdown their engines at will in a safe and easy way. This is the preferred implementation of the present invention:

Starts engine: [the left brake lever (21)]+[the start button (31)];

Engine stop: [the right brake lever (22)]+[the start button (31)] or

[the left brake lever (21)]+[the right brake lever (22)]+[the start button (31)];

Motorcycle retains original features and functionality.

Applying the concept of the present invention to automobiles, since automobiles have only one set of brake signals, so the automobile manipulation equipment apply to the AT (Automatic Transmission) which preferred embodiment electric signal sources may include the brake signal, N (Neutral) signal, D (Drive) signal, and add one of four other button signal kinds; using the brake, N, D these three signals to plan and integrate to became two groups combinations state of selection signals; and a button use to confirm and execute the confirmation signal.

The [braking+N] generate the start engine selection signal;
The [braking+D] generate the stop engine selection signal;
The [button] generate the confirmation signal;

The present invention preferred embodiment application mode in AT automobile, in simple words:
The [braking+N]+[button] for execution engine starting action;
The [braking+D]+[button] for implement engine stopping;
From each interaction of implement engine starting or stopping application, the AT automobile maintains original features and function.

The MT (Manual Transmission) automobile preferred embodiment of the manipulation equipment electric signal sources may include the brake signal, N (Neutral) signal, C (Clutch) signal, and add one of four other button signal kinds; using the brake, N, C these three signals to plan and integrate to became two groups combinations state of selection signals; and a button use to confirm and execute the confirmation signal.

The present invention preferred embodiment application mode in MT automobile, in simple words:
The [braking+N] (regardless has the clutch signal or not)+[button] for execution engine starting action;
The [braking+C] (other than N)+[button] for implement engine stopping;
From each interaction, such as engine starting or stopping, the MT automobile original features and functionality will be maintained.

With the above preferred embodiment of motorcycle, MT and AT automobile application mode reveal the meaning and spirit of the present innovation invention, and, explaining that it can be according to different type vehicles control characteristics to different design, using the two or more existing suitable vehicles manipulation equipment generate electric signal, integrating became two groups selection signal, and collocating an existing or a new addition button interact with produced confirmation signal, to achieve starting or stopping engine control purpose.

The motorcycle button switch application can use original start button switch; that applied in the automobile, it will add a new button switch placed on head of the gear lever, in the drivers thumb, index or middle finger convenient to operate, where can easily pressed the button, provide the driver a convenient operation for execution engine starts or stop functions. Based on considerations of control security, the button switch must have tactility design, so that drivers press the button in the autonomous conscious, to avoid inadvertently triggering the button.

To automobile used in the integration controller of the present invention, based on considering engine restart performance, when engine idling stopping, it will automatically turn off the power of vehicles using electrical equipment which is high power consumption or impeding engine restart performance; such: automatically turn off headlamps, fog lights, air conditioning compressor clutch . . . etc., reduce the battery of power consumption after engine stopped, and contribute to mitigate restarting engine loading. After engine restart, the integration controller will auto restore those electrical equipment power, return to engine stopping status before.

And then, to achieve "auto-lighting position lamps to show vehicle location" purpose, which comprising: a position lamp controller (02) and an environment illuminance sensor (03) two parts. The environment illuminance sensor (03) is illuminance induction element or illuminance detection means; and, the position lamp controller (02) composed by the electronic elements and logic circuits.

Figure 3:
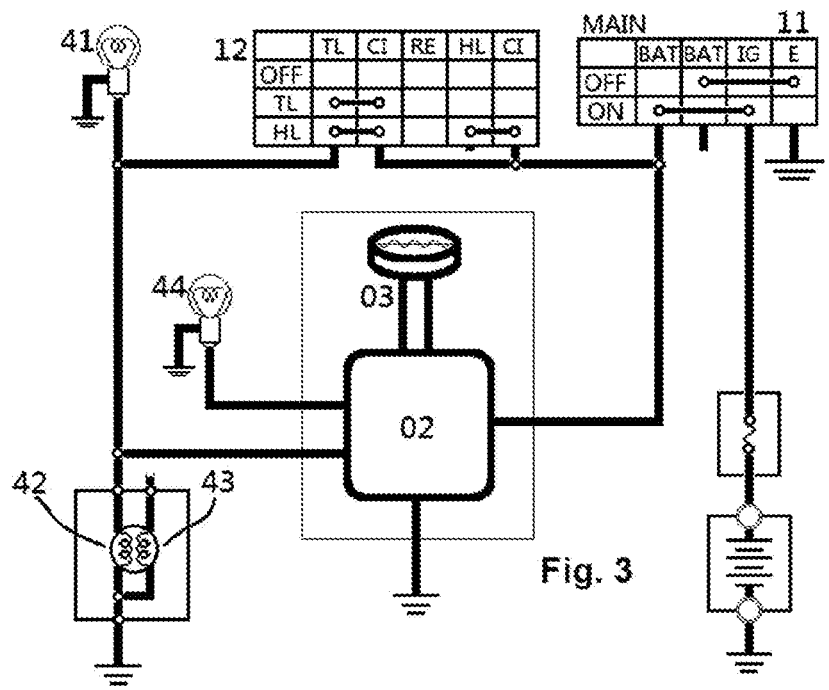
FIG. 3 is a diagram depicting the controlling of the position light of a vehicle with a rechargeable battery

FIG. 3 is the position lamp controller of integrating application circuit schematic according to the present invention. Hereby apply FIG. 3 as the sample to descript the detail of the present invention:

The position lamp controller (02) requires power supply electrical connection from vehicle keyswitch (11) "ON" place, by vehicle keyswitch turn on the position lamp controller function.

The environment luminance sensor (03) is electrically connected to the position lamp controller (02), it is the illuminance induction element or the illuminance detection means; set it in vehicle suitable place, to detection vehicle location ambient illuminance intensity, and generate corresponding parameter signal provided to the position lamp controller (02).

The position lamp controller (02) is electrically connected to one or more of lamps to show the vehicle's location, such as vehicle the front position-lamps (41), tail lamps (42), or other like eyebrow lamps, decorative lamps, and even the turn lights, . . . etc. low power consumption, the lamps is efficiently displaying the vehicle location; if vehicle original configuration lamps are not sufficient to meet highlights the security purpose of vehicle location, add one or more position-lamps (44), to increase vehicle location display intensity.

At the time vehicle-key open keyswitch (11), the position lamp controller (02) and the environment illuminance sensor (03) enters the operating state. The environment illuminance sensor (03) to according sensing the intensity of vehicle location ambient light generate parameter values transmit to the position lamp controller (02), when the parameter values meet the preset value, (namely weather foggy, rainy, the sky dark . . . etc. or vehicle driving in underpasses, tunnels, tree dense area, the ambient illumination condition parameter setting value), position lamp controller (02) will turn on the front position lamps (41) and the tail lamps (42) or include other add in position lamps (44) the power to light up; when condition does not meet the preset parameter values, the position lamp controller (02) and the front-position-lamps (41), the tail lamps (42) and the add in position lamps (44)

circuitry will be an open circuit, of which the headlamp switch (12) original features of unchanged and no effect, keep vehicle the headlamp switch (12) original function.

The design of the present invention make the vehicle no need to light the daytime running lamps in ample ambient illumination, no need to use the vehicle limited battery power, that is, reduced the carbon footprint waste with needless. When vehicle is in low illuminance location, through the environment illuminance sensor (03) parameter values to transmit the position lamp controller (02), and executive the suitable conditions function, automatically light the selected electrical connection lamps to show vehicle location, to solve the poor illumination problems by showing vehicle location, to meet the traffic safety objectives of the present invention.

Applied to vehicles that have no storage battery like rickshaws, bicycles etc . . . , is adopt monomers "sensing of auto-light lamp" design, that is designed a shell, the position lamp controller (02), the environment illuminance sensor (03), the lamps (44) to integration into one; use portable battery as the power supply, and design the battery integrating inside the shell, or the outside connection type, and set a switch between the current source and the position lamp controller (02), this switch can be design in the shell, to serve as the monomer "sensing of auto light lamps" function the means enabled or not; makes it become fully functional monomer "sensing of auto light lamps".

And then, the more progressive design is: the switch is not planning in the shell; it is placed in a suitable location of the vehicles, like the handle of vehicles, and pedal or seat. The switch is the detector or sensor type, like infrared detection or static induction switch, and, can connect to the position lamp controller (02) by wireless signals links electrical, to detect or induct the vehicle driver at place situation, when the driver is in the setting location, will open the position lamp controller function.

The abovementioned illustrates the present invention "auto light position lamps to show vehicle location", applied to equip with storage battery vehicles, and other, no storage battery like rickshaws, bicycles . . . etc. such vehicles implementation application mode.

In here, the integrated controller (01), the position lamp controller (02), and the environment illuminance sensor (03), use one of the Scooter series motorcycle circuit as example, integrate the circuit into one.

Figure 4:
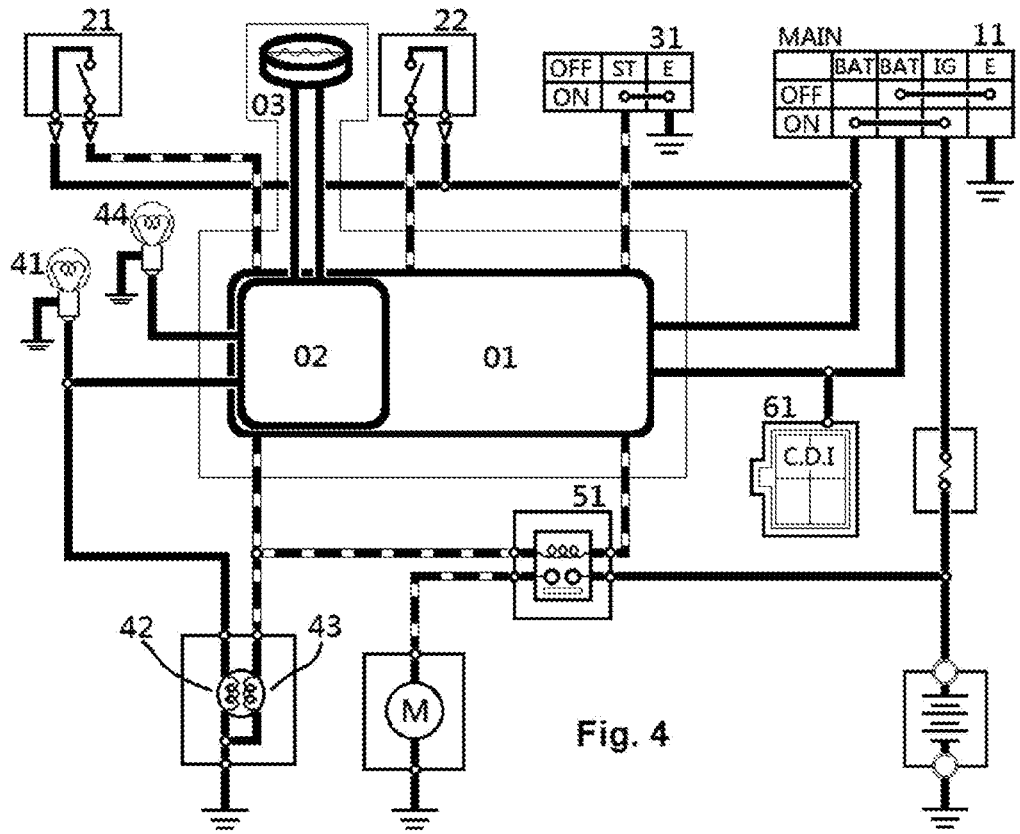
FIG. 4 is a diagram depicting the integration of the whole technology

FIG. 4 is an integration application of the complete technology schematic according to the present invention. There are "The vehicle engine start and stop control method" and "auto-lighting the position-lamps to show vehicle location" the full features of the present invention; thus providing the vehicle operation waiting stoplight with no-idling traveling on the road, an optimum engine stop and restarting control mode, and solving the lighting alert safety problem when the vehicle is in an environment with poor ambient illumination.

The vehicle engine start and stop control method, not only operate to idling stop in vehicle waiting stoplight time, more suitable use for vehicle in any needs to operate the engine start or stop, and can full meet the operation of vehicle engine no-idling purpose, "car parking can instantly stop, departure can immediate start", achieve the vehicles no necessary to engine idling; and provide the most environmentally friendly and most proper automated vehicle location lighting safety warning methods; so as reveals the full creation content of the present invention.

Although the invention has been described with reference to the above embodiments it will be apparent to one of the ordinary skill in the art that modifications to the described embodiment may be made without departing from the spirit of the invention. Accordingly, the scope of the invention will be defined by the attached claims not by the above detail descriptions.

What is claimed is:

1. A method of controlling an engine of a vehicle, the method comprising:
   obtaining at least one first selection signal according to a first braking signal and a first gear position signal of the vehicle when a gear lever of the vehicle is not in P (Park) and is not in N (Neutral) position during an idling period of the vehicle after the vehicle is stopped;
   generating a first confirmation signal after the at least one first selection signal is obtained, wherein the first confirmation signal is generated through manually pressing a button switch located on the head of the gear lever of the vehicle during the idling period of the vehicle;
   generating a stopping signal to stop the engine during the idling period of the vehicle according to the at least one first selection signal when the first confirmation signal is activated;
   obtaining at least one second selection signal according to a second braking signal and a second gear position signal when the gear lever of the vehicle is in P (Park) or N (Neutral) position after the engine is stopped;
   generating a second confirmation signal after the at least one second selection signal is obtained, wherein the second confirmation signal is generated through manually pressing said button switch again; and
   generating a starting signal to start the engine according to the at least one second selection signal when the second confirmation signal is activated;
   wherein the starting signal and the stopping signal are generated by a control circuit, wherein the control circuit receives the at least one first and the at least one second selection signals, and the first and the second confirmation signals, wherein once each of the first and the second confirmation signals is activated, the control circuit outputs either the stopping signal or the starting signal according to said obtained selection signals only.

2. The method of claim 1, wherein the vehicle is a manual-transmission type, wherein said at least one first selection signal is obtained according to the first braking signal, the first gear position signal and a clutch signal of the vehicle.

3. The method of claim 1, further comprising generating a shut-down signal to turn off a front lamp of the vehicle when the stopping signal is generated.

4. The method of claim 1, further comprising generating a shut-down signal to turn off the power supply of a powered device of the vehicle when the stopping signal is generated and generating a restoration signal to restore the power supply of the powered device of the vehicle when the starting signal is generated.

5. The method of claim 1, further comprising generating a lighting-on signal to light on at least one low-power lamp when a parameter value of an environment illuminance sensor is in a pre-defined range.

* * * * *